(12) United States Patent
Asakura

(10) Patent No.: US 7,108,950 B2
(45) Date of Patent: Sep. 19, 2006

(54) INSTANT FILM UNIT

(75) Inventor: Katsuyoshi Asakura, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/171,268

(22) Filed: Jul. 1, 2005

(65) Prior Publication Data
US 2006/0002692 A1    Jan. 5, 2006

(30) Foreign Application Priority Data
Jul. 1, 2004    (JP)    ............................. 2004-195959

(51) Int. Cl.
*G03C 8/44*    (2006.01)
*G03C 8/48*    (2006.01)
(52) U.S. Cl. ...................... 430/207; 430/209; 430/499; 396/583

(58) Field of Classification Search ................ 430/207, 430/209, 499, 210; 396/583
See application file for complete search history.

(56) References Cited

U.S. PATENT DOCUMENTS

| 4,693,963 A | | 9/1987 | McCole |
| 4,824,761 A | * | 4/1989 | Sturgis et al. ............... 430/209 |
| 6,304,725 B1 | | 10/2001 | Kitagawa et al. |

FOREIGN PATENT DOCUMENTS

| JP | 63-73743 U | 5/1988 |
| JP | 3048920 U | 3/1998 |
| JP | 2002-23254 A | 1/2002 |

* cited by examiner

*Primary Examiner*—Richard L. Schilling
(74) *Attorney, Agent, or Firm*—Sughrue Mion, PLLC

(57) ABSTRACT

Corner mask portions are provided at four corners of an exposure opening. The corner mask portions are formed by rounding the corners into curves. The quantity of developing solution contained in a developing solution pod is reduced, consequently, it is possible to reduce the thickness of a solution pod section and a trap section.

9 Claims, 6 Drawing Sheets

ADVANCING DIRECTION

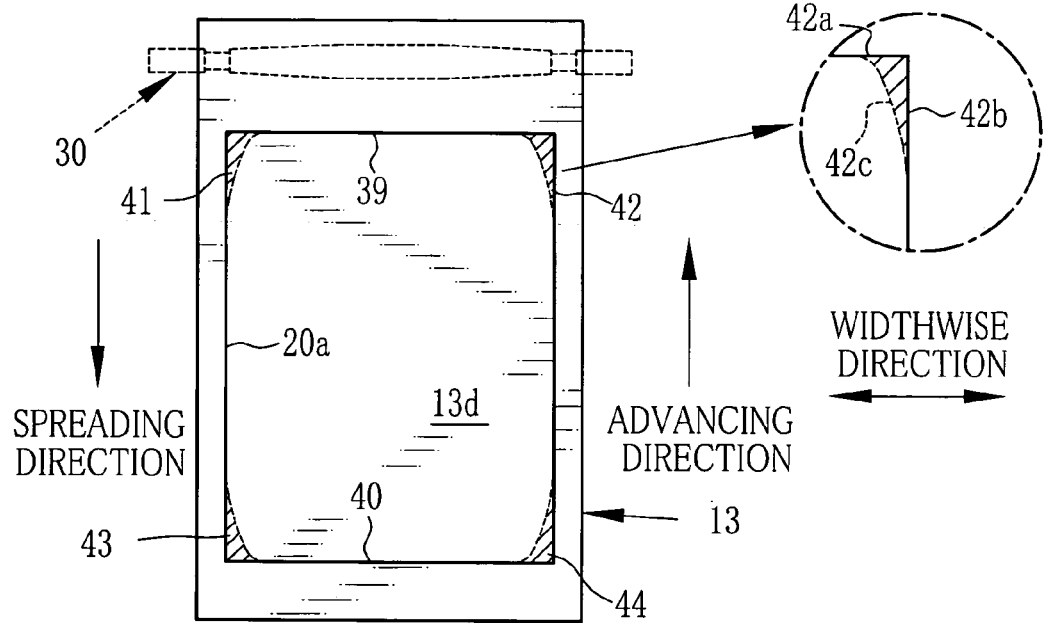
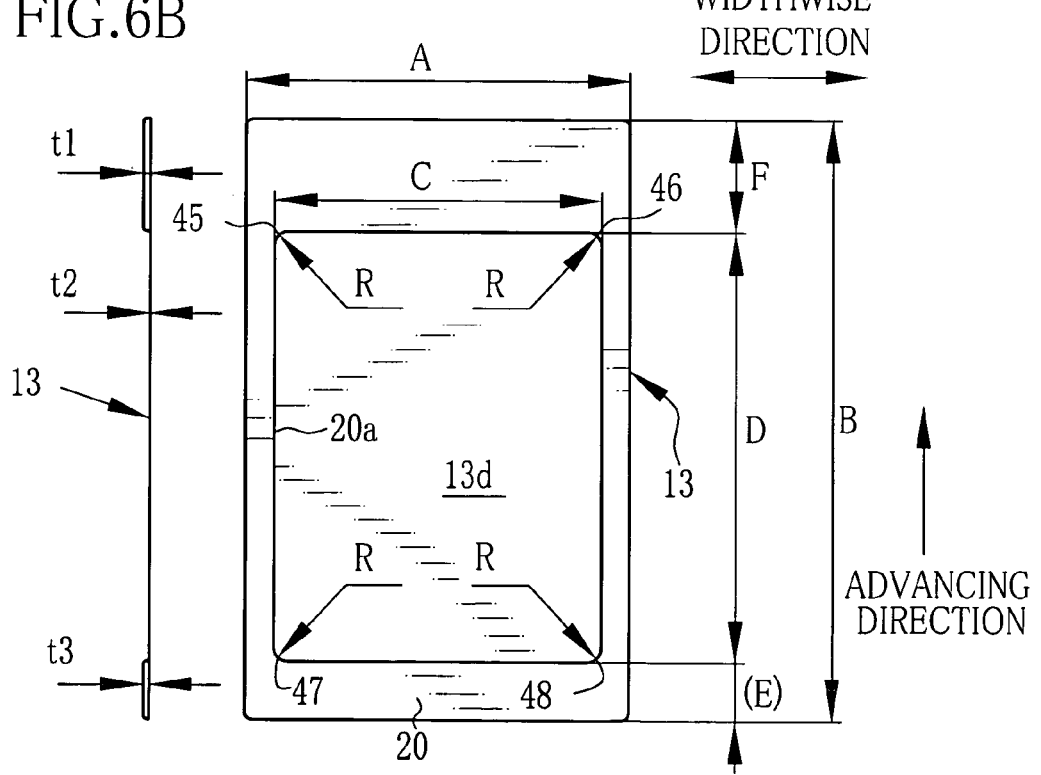

WIDTHWISE DIRECTION

INSTANT FILM UNIT

BACKGROUND OF THE INVENTION

1. Field of the Invention

The present invention relates to an instant film unit of a self-developing type.

2. Description Related to the Prior Art

An instant film unit (hereinafter referred to as a "film unit") has a peel-apart type and a monosheet type. Each of them maintains a characteristic of providing a printed photo soon after photography. In the peel-apart type, after the film unit is loaded into a printer or an instant camera and is recorded an image, a photosensitive sheet is overlaid on an image receiving sheet by an operation of pulling a tab. The peel-apart film unit needs a manual step of putting those overlaid sheets into between a spreading roller pair. On the other hand, the film unit of the monosheet type is in a sheet shape, and it is possible to eject the film unit outside automatically. Therefore, the monosheet film unit is widespread among the general public.

A printer using the film unit is assembled such that an exposure head in a line shape is moved on the photosensitive surface of the film unit and exposes three fields of red, green and blue sequentially, then the exposed film unit is ejected through the spreading roller pair while it is processed (JP-A 2002-023254).

The monosheet film unit includes a photosensitive surface on which a latent image is created by exposure, a photosensitive sheet having a image creating surface on which a positive image is created, a cover sheet overlaid on the photosensitive sheet, a developing solution pod for containing developing solution to be spread between these sheets, a trapping material for catching a surplus of the developing solution being spread. Furthermore, these components are integrated by a white mask sheet (U.S. Pat. No. 6,304,725).

The film unit described in U.S. Pat. No. 6,304,725 has the approximately same size as a business card or a credit card(hereinafter referred to as a card size). The film unit has such a size to fit into a widespread business card holder (54 mm width×86 mm length) that it may be easy to arrange a plurality of the exposed film units (photo prints). Moreover, by filing a plurality of the business card holders containing the photo prints, it is possible to make a photo album readily and to watch well-organized photo prints.

In the film unit described in U.S. Pat. No. 6,304,725, a photosensitive layer and a image receiving layer are formed on each face of one sheet. Accordingly, an exposing side is different from an observing side. The film unit described in U.S. Pat. No. 4,639,963 includes a transparent image receiving sheet and a photosensitive sheet. The exposing side is the same as the observing side. In either film unit, a positive image is in a rectangle. Further, for the purpose of providing a more decorative effect, there are the known instant films. One of which is pre-exposed a frame on the inside margin of the opening on the mask sheet (JP-U 63-73743), and another includes the opening for the exposure in a heart shape or a circle (JP-U 3048920).

However, the developing solution pod and the portion including the developing solution pod becomes thick to some extent, because the film unit generally includes a developing solution pod containing developing solution with a certain extent of extra, for spreading the developing solution on the whole exposure area. Also, due to an increased surplus of developing solution, a trapping material to be used for catching the surplus has necessarily to have a certain thickness, and the portion including the trapping material also becomes thick. Thus, when the film unit has a thickness, there is a problem that it is bulky in the card folder or the album.

SUMMARY OF THE INVENTION

In view of the foregoing problems, an object of the present invention is to provide an instant film unit with a small thickness, which is less bulky in a small-sized holder and an album.

In order to achieve the above and other objects and advantages of this invention, an instant film unit includes corner mask portions for covering four corners of an exposure opening corresponding to solution-deficient areas where developing solution is difficult to spread. Of the four sides comprising the exposure opening, the linear length of two sides extending in a conveying direction is shorter than the length of the straight line passing the center of the opening. Any shape of the corner mask portion may fulfill the purpose. For example, a curve of an arc shape is preferable, which can be formed at the same time of punching out the exposure opening.

Furthermore, when Q1 (μl) denotes the quantity of developing solution necessary to spread on the whole area of the exposure opening described above and the four corners corresponding to the corner mask portions, namely, the whole area of the exposure opening with four right angle corners(the quantity of the solution reaching the trap section), Q2 (μl) denotes the quantity of the developing solution necessary to spread the whole area of the exposure opening with four curved corners, r (mm) denotes a radius of the curve, and a vertical to horizontal ratio of the exposure opening is 4:3 (where the vertical corresponds to the long side of the exposure opening, and the horizontal corresponds to the short side), the condition to be satisfied is $$r>0.4\times(Q2-Q1).$$

Moreover, with regard to any one of the four corners of the exposure opening, when a(mm) denotes the length of the solution-deficient area in the width wise direction where the developing solution does not spread, b(mm) denotes the length of the solution-deficient area in the conveying direction, L(mm) denotes the maximum width of the exposure opening, and t(mm) denotes a thickness of the developing solution spread on the exposure opening area, $Q2-Q1=(2L-a)bt$ is obtained. And, the radius is expressed by $$(-a/b)x_1+a<r+(2rx_1-x_1^2)^{1/2}$$

where $(0<x_1<b)$ is met.

In the film unit of the present invention, the area ratio of a blank region for containing a developing solution pod and a trapping member to the exposure opening is defined to 1.2, preferably 1.3 or less. Furthermore, since LCDs and other monitors generally have the vertical to horizontal ratio of 3:4, applying this vertical to horizontal ratio to the exposure opening enables to skip the step of, for example, trimming an image in image processing. Also, the corner mask portion may be formed to cover the solution-deficient area and to have a decorative effect, so that the film unit has more artistic taste.

In the present invention, the corner mask portions are disposed in the exposure opening. Of four sides comprising the exposure opening, the two sides extending in the conveying direction are shorter than the maximum length of the exposure opening in the conveying direction. Therefore, the spreading efficiency of the developing solution is improved. Thus, it is possible to reduce the quantity of the developing solution contained in the developing solution pod. Also, it is possible to reduce the thickness of the trapping member, along with the developing solution pod. This enables the film unit to be manufactured with lower cost and high quality. Further, in a camera using a film unit having a large exposure opening (the exposure surface), it is necessary to use a lens providing a large image circle. However, the corner mask portion serves to reduce the size of the image circle and thus reduce the manufacturing cost of the camera.

BREIF DESCRIPTION OF THE DRAWING

The above objects and advantages of the present invention will become more apparent from the following detailed description when read in connection with the accompanying drawings, in which:

FIG. 5 is an explanatory view illustrating how developing solution is spread on an exposure surface;

FIG. 6A is a plan view, illustrating the film unit;

FIG. 6B is a view from the left side, illustrating the film unit;

DETAILED DESCTIRPTION OF THE PREFERRED EMBODIMENT(S) OF THE PRESENT INVENTION

Figure 1:
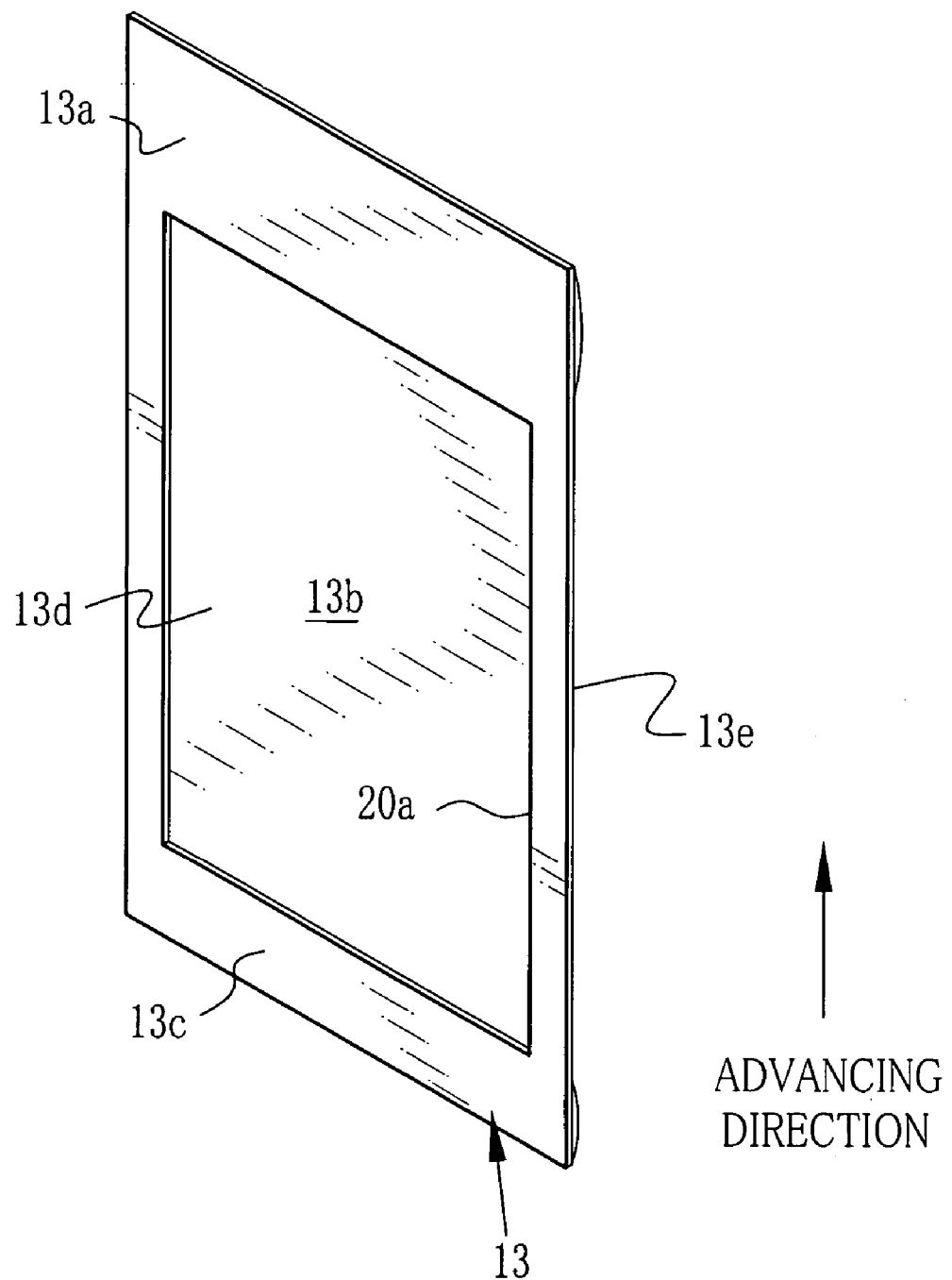
FIG. 1 is a perspective view illustrating an instant film unit.

As described in FIG. 1, a film unit 13 is in a sheet shape with a small thickness. The film unit 13 is a self-developing type film unit, provided with a developing solution pod section 13a, an exposure section 13b, and a trap section 13c, in such order from a downstream side (an upper end in the figure) of an advancing direction in an instant camera. As described in U.S. Pat. No. 6,304,725, the exposure section 13b is composed of a photosensitive layer being an exposure surface 13d, a white diffusing/reflecting layer, and an image receiving layer. The film unit 13 is a transmission type, in which the exposure surface 13d to be exposed is different from a positive image surface 13e where an image is observed.

The solution pod section 13a contains developing solution. The developing solution is spread on the photosensitive layer, and then a latent image recorded in the photosensitive layer is transferred to the image receiving layer as a positive image through the diffusing/reflecting layer. The image transferred to the image receiving layer is observable on the positive image surface 13e as the positive image. The trap section 13c catches and hardens a surplus of developing solution spread between the photosensitive layer and a cover sheet. The exposure section 13b is thinner than the solution pod section 13a and the trap section 13c. The film unit 13 is a monosheet type, having a shape of single sheet.

Figure 2:
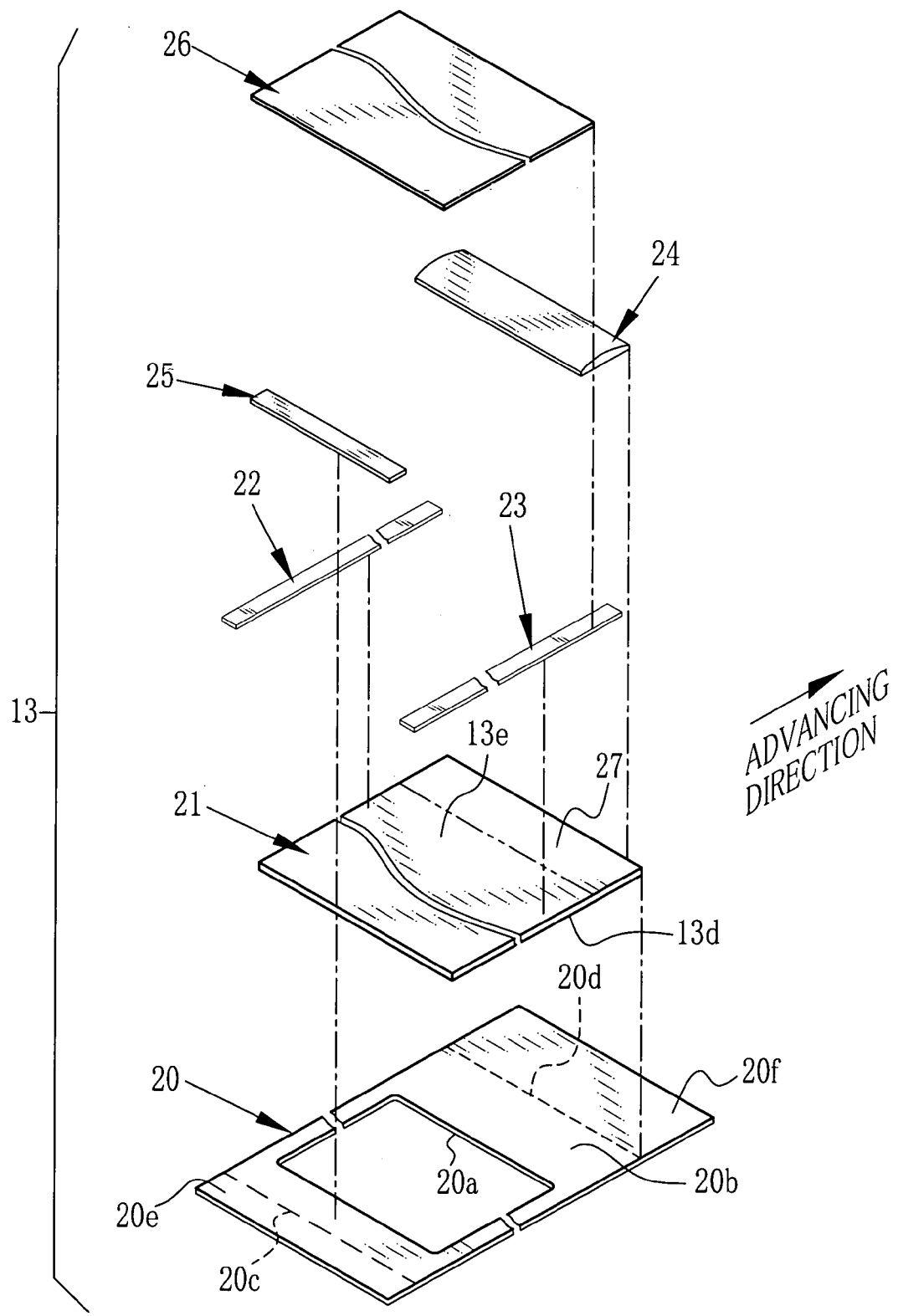
FIG. 2 is an exploded perspective view illustrating a structure of the film unit.

As shown in FIG. 2 and FIG. 3, the film unit 13 is composed of a mask sheet 20, a photosensitive sheet 21, a pair of spacer rails 22 and 23, a developing solution pod 24, a trapping material 25, and a transparent cover sheet 26. The film unit 13 in FIG. 2 and FIG. 3 is viewed from the side of the positive image surface 13e.

The mask sheet 20 is a plastic sheet with small thickness and includes an exposure opening 20a. The edge of the exposure opening 20a defines an exposure area in a camera or a printer. On a rear face 20b of the mask sheet 20 (a face appeared in FIG. 2), an adhesive agent is applied. The outside ends of the exposure opening 20a include folded portions 20e and 20f for being folded along folding lines 20c and 20d.

The photosensitive sheet 21 has the same length in a widthwise direction as the mask sheet 20, and is attached to the rear face of the mask sheet 20 so as to close the exposure opening 20a.

The spacer rails 22 and 23 are adhered on both sides of the photosensitive sheet 21 along an advancing direction, and on the upper face of the spacer rails 22 and 23, the cover sheet 26 is attached with the adhesive agent. A constant space is created between the photosensitive sheet 21 and the cover sheet 26, and developing solution is spread therebetween with keeping an even thickness.

A developing solution pod 24 is formed in an approximate bag shape, containing developing solution therein. A spreading roller pair in a camera pressurizes to tear open the solution pod 24, and developing solution flows out to develop the photosensitive sheet 21. According to this, the positive image appears on the positive image surface 13e of the photosensitive sheet 21.

The developing solution pod 24 is adhered on one end 27 of the photosensitive sheet 21 and enclosed in the folded portion 20f of the mask sheet 20. In a practical sense, an under sheet is overlaid on the photosensitive sheet 21, and the developing solution pod 24 is attached-on the under sheet.

A trapping material 25 is adhered on the mask sheet 20, upstream in the advancing direction. A surplus of developing solution in the developing process is absorbed and trapped by a trapping material 25. The trapping material 25 is enclosed in another folded portion 20e of the mask sheet 20.

Figure 3A:
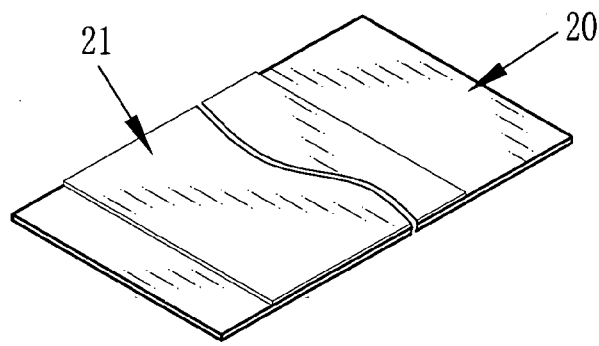
FIG. 3A to 3D are perspective views illustrating the process of manufacturing the film unit.
Figure 3B:
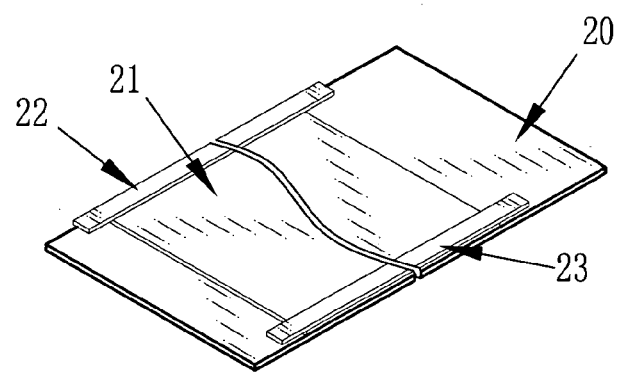
Figure 3C:
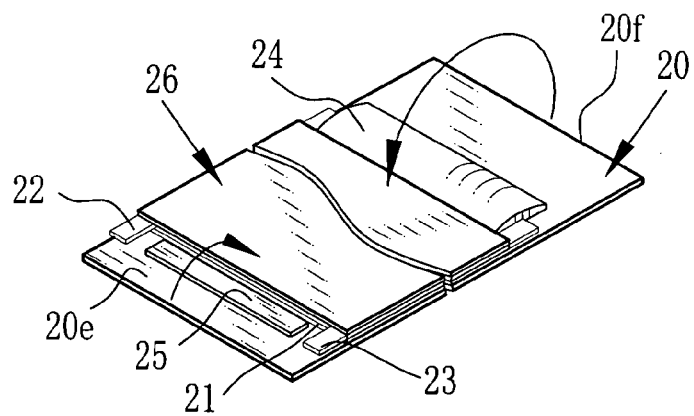
Figure 3D:
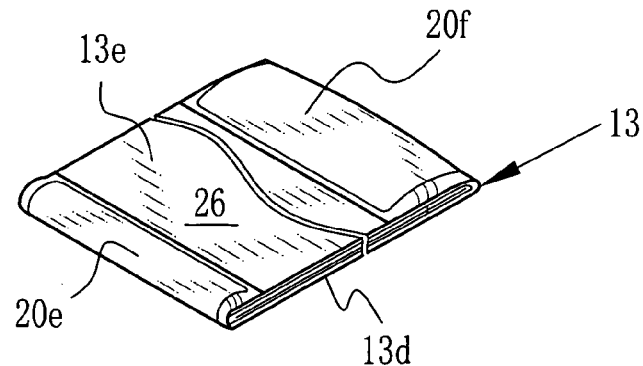

Each of the folded portions 20e and 20f of the mask sheet 20 is folded from each of the folding lines 20c and 20d toward the direction of the arrow shown in FIG. 3C. The edge and ends of each folded portion 20e and 20f are adhered to the rear face of the cover sheet 26. In this manner, the mask sheet 20 encloses to hold the developing solution pod 24 and the trapping material 25, and the developing solution is prevented of leaking outside the film unit 13. In the film unit 13, since the mask sheet 20 covers the periphery of the photosensitive surface on the photosensitive sheet 21, the area practically displaying an image of the film unit 13 corresponds to the area of the exposure opening 20a. The exposure opening 20a is a rectangular opening, with its two sides along the advancing direction being longer than the other two sides. And the opening 20a is formed by punching out with a press cutter or a laser cutter.

A plurality of the film units 13 being stacked is contained and loaded into an instant camera as an instant film pack. When shutter release is conducted, an exposure is performed on the exposure surface 13d of the film unit 13, set in the exposure opening of the instant film pack. After the exposure, a claw member is operated to eject the exposed film unit 13 from the instant film pack.

The film unit 13 is nipped by a spreading roller pair, shortly before the ejecting operation of the claw member is finished. The spreading roller pair rotates with nipping the film unit 13 to convey it toward the advancing direction. During the conveyance of the film unit 13, the developing solution pod 24 is torn open by pressurization of the spreading roller pair. The developing solution flowing out is spread between the photosensitive sheet 21 and the cover sheet 26. In this way, the film unit 13 is ejected outside the camera from a film exit slot, with developing solution being spread. A positive image appeared on the positive image surface 13*e* of the film unit 13 after a lapse of predetermined time.

Figure 4:
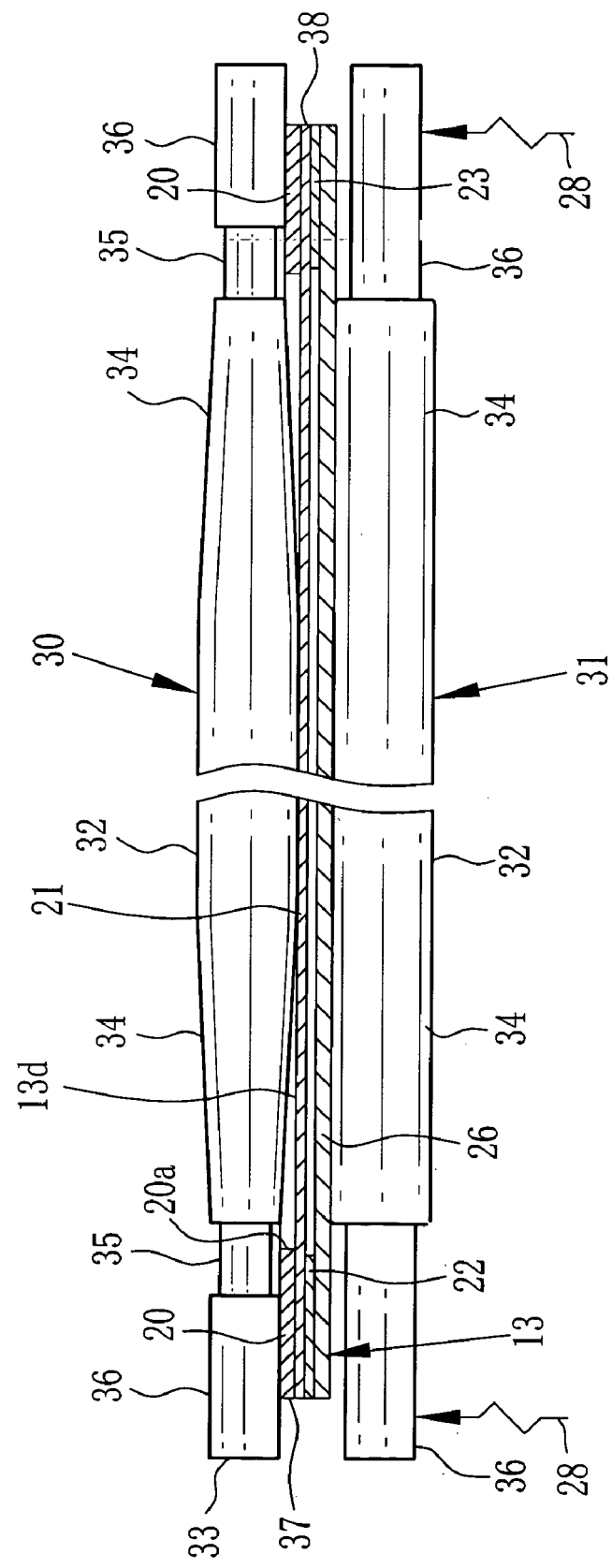
FIG. 4 is an explanatory view illustrating the film unit nipped by a spreading roller pair of an instant camera.

As described in FIG. 4, a spreading roller 30 has a symmetrical shape, including a central portion 32, an adjacent portion of the center 34, a grooved portion 35, an end portion 36, and an end . 33, sequentially from its center. The spreading roller 30 is in a crown shape, in which the diameter of the central portion 32 is larger than those of the end portion 36 and the adjacent portion of the center 34. The grooved portion 35 has a smaller diameter than the diameters of the end portion 36 and the adjacent portion of the center 34. A spreading roller 31 has the same diameter in every portion thereof, and is biased with a pair of springs 28. In spreading, the ends 37 and 38 of the film unit 13 in the widthwise direction are positioned between the right and left end portions 36 of the spreading roller 30, and the both edges of the opening 20*a* in the widthwise direction are positioned within the grooved portions 35 of the spreading roller 30. And, the right and left adjacent portions 34 enter into the opening 20*a*. In such a state, the film unit 13 is pressed between the spreading rollers 30 and 31, and is advanced. At the same time, the developing solution is spread.

As shown in FIG. 5, uneven surface is formed to each of two opposing edges of the exposure opening 20*a* in the advancing direction. Accordingly, there is a tendency that developing solution is difficult to spread to the four corners of the exposure opening 20*a* (the hatching areas 41 to 44). Those areas 41 to 44 respectively form an approximate triangle consisting of a side 42 *a* extending toward the widthwise direction of the film unit 13, a side 42*b* extending toward the advancing direction, and a curve 42*c*. The side 42*b* is longer than the side 42*a*. Therefore, when the quantity of developing solution is insufficient, a problem occurs that developing solution cannot spread to the corner areas 41 to 44. Hereinafter, the corner areas 41 to 44 are referred to as solution-deficient areas.

As shown in FIG. 6, corner mask portions 45 to 48 are provided on the four corners of the exposure opening 20*a* to cover the solution-deficient areas 41 to 44. Each corner mask portion 45 to 48 is formed by providing a rounded curve R with the four corners of the opening 20*a*. According to this, the area of the exposure surface 13*d* is reduced by the portions of the rounded curves R, so that it is possible to certainly spread the developing solution to the four corners.

Thus, due to such improved spreading efficiency of developing solution, it is possible to reduce the quantity of developing solution contained in the developing solution pod 24. This allows the developing solution pod 24 to become thinner.

Table 1 shows the example of each dimension of the film unit 13, listing the roman numerals in FIG. 6A.

TABLE 1

| | PRESENT EMBODIMENT | CONVENTIONAL EMBODIMENT | RATIO |
|---|---|---|---|
| A | 54 mm | 54 mm | SAME |
| B | 85.6 mm | 85.6 mm | SAME |
| C | 46 mm | 46 mm | SAME |
| D | 61.3 mm | 62.1 mm | 99% |
| E | 8.3 mm | 7.5 mm | 111% |
| F | 16 mm | 16 mm | SAME |
| R | Radius 2 mm | 0 mm | |

As described in Table 1, in relation to the size of the exposure opening 20*a*, the conventional embodiment offers a 4:2.96 ratio of the length in the advancing direction (length) to the length in the widthwise direction (width). Compared to this, the present embodiment offers a 4:3 ratio and the rounded curve R is formed to be a circular arc of 2 mm radius on each corner of the opening 20*a*, where the rounded portion is not provided in the conventional embodiment. The corner mask portions 45 to 48 are equivalent to the areas surrounded by the rounded curve R and two straight lines organizing a corner.

According to this, as indicated in Table 2, the film unit 13 of the present embodiments can reduce the quantity of developing solution being contained by 73.5% from the conventional film unit. Correspondingly, it is possible to reduce the thickness of the spread developing solution on the exposure surface 13*d* (a space between the cover sheet 26 and the photosensitive sheet 21), and the thickness of the trapping material 25 for absorbing the developing solution ejected outside the exposure surface 13*d*.

TABLE 2

| | PRESENT EMBODIMENT | CONVENTIONAL EMBODIMENT | RATIO |
|---|---|---|---|
| QUANTITY OF CONTAINED DEVELOPING SOLUTION | 180 μl | 245 μl | 73.5% |
| THICKNESS OF SPREAD DEVELOPING SOLUTION ON EXPOSURE SURFACE | 38 μm | 55 μm | 69.1% |
| SURPLUS OF DEVELOPING SOLUTION OVER EXPOSURE SURFACE | 55 μl | 70 μl | 78.6% |
| THICKNESS OF TRAPPING MATERIAL | 0.5 mm | 0.65 mm | 76.9% |

As described in Table 3, the film unit 13 of the present embodiments can reduce the thickness of the solution pod section 13*a* by 91%, and the thickness of the trap section 13*c* by 84%, from the conventional film unit.

TABLE 3

| | PRESENT EMBODIMENT | CONVENTIONAL EMBODIMENT | RATIO |
|---|---|---|---|
| THICKNESS OF POD SECTION (t1) | 1.0 mm | 1.1 mm | 91% |
| THICKNESS OF EXPOSURE SECTION (t2) | 0.2 mm | 0.2 mm | SAME |
| THICKNESS OF TRAP SECTION (t3) | 0.8 mm | 0.95 mm | 84% |

The rounded curve R formed on the each corner of the exposure opening 20*a* is a circular arc with 2 mm radius. However, as long as the radius is below the maximum radius derived from the length in the advancing direction and the length in the widthwise direction of the exposure opening

20a, any numeric value of the radius fulfils the purpose. In addition to the example of forming with a single circular arc, the rounded portion may be formed with a curve connecting more than two circular arcs of the different radius. In this case, it is preferable to dispose the larger radius circular arc to contact with the side extending in the advancing direction, because the roundness is approximately conformed to the outline of the solution-spreading area. Moreover, the corner mask portions 45 to 48 may be formed by chamfering the four corners of the exposure opening 20a.

As a result of evaluating the effective roundness or the effective length of the chamfer to reduce the thickness from experiment, it is preferable to satisfy the following formulas (1) and (2).

$$r > 0.4 \times (Q2 - Q1) \qquad (1)$$

Q1 (μl) described in formula (1) denotes the quantity of developing solution reaching the trap section necessary for the whole region of the exposure surface 13d and the corner areas corresponding to the corner mask portions, namely, the exposure surface (the area where the exposure opening is disposed) in the case of the exposure opening having four right angle corners. Q2 (μl) denotes the quantity of developing solution reaching the trap section necessary to spread on the exposure surface in the case of the exposure opening having four curved corners, and r(mm) denotes the radius of the rounded curve or the length of chamfer. The coefficient 0.4 has units of mm/μl. The exposure surface 13d has the vertical to horizontal ratio of 4:3 (where the vertical corresponds to the long side of the exposure opening, and the horizontal corresponds to the short side).

Figure 7:
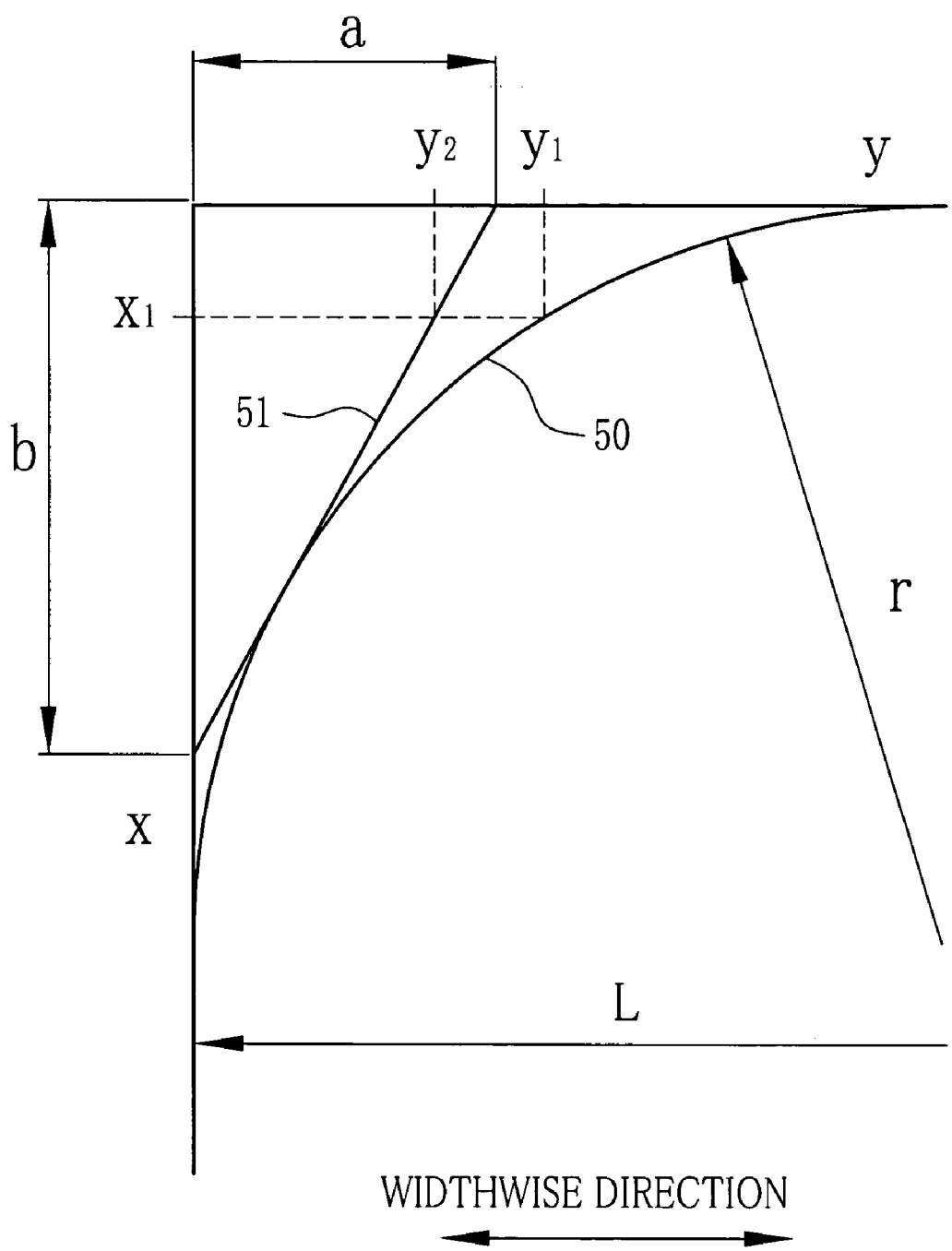
FIG. 7 is an explanatory view illustrating enlarged form of a mask portion to explain Formula 2.

Also, by using FIG. 7, the formula (2) may be obtained theoretically.

$$(-a/b)x_1 + a < r + (2rx_1 - x_1^2)^{1/2} \qquad (2)$$

where $(0 < x_1 < b)$.

In the formula (2), a(mm) denotes the maximum length in the widthwise direction of the solution-deficient area, disposed on one corner of the exposure opening 20a, and b(mm) denotes the maximum length in the advancing direction of the solution-deficient area. As shown in FIG. 7, x denotes the arbitrary position on the side in the advancing direction, and y denotes the arbitrary position on the side in the widthwise direction. L(mm) denotes the maximum width of the exposure surface, and t(mm) denotes the thickness of developing solution spreading on the exposure surface. In the above case, $Q2 - Q1 = (2L - a)bt$ is expressed.

In addition, the formula (2) is derived from the following equations.

As shown in FIG. 7, in the relation with r, a boundary curve 50 is defined to meet the following formula $$(x - r)^2 + (y - r)^2 = r^2,$$

and a border line of the solution-deficient area 51 is defined to meet the following formula $$y = (-a/b)x + a.$$

In this case, $y_2 < y_1$ is set. Thus, at the arbitrary x, $$x_1^2 + ((-a/b)x_1 + a)^2 > x_1^2 + (r + (r^2 - (x_1 - r)^2)^{1/2})^2$$

is derived, where $0 < x_1 < b$ is set.

In regard to the numeric value of variables used in the formula (1) and (2), it is preferable from the result of experiment that r=1 to 4 mm, Q2=15 to 40 μl, and Q1=10 to 35 μl. From the theoretical calculation, it is suitable that L=40 to 100 mm and t=0.02 to 0.06 mm.

Moreover, it is preferable that each of the solution-deficient areas 41 to 44 is 0.04 to 0.09% of the whole area of the solution-deficient areas 41 to 44 and the exposure surface 13d. This is derived from the grounds that when L=40 to 110 mm is set and the vertical to horizontal ratio is 4:3, the maximum length of the exposure surface 13d in the advancing direction is preferably 53 mm to 146.7 mm, and r is preferably 1 mm to 4 mm.

Besides, the quantity of the surplus solution over the exposure surface may be defined with reference to the maximum width of the exposure surface. In this case, when L=40 to 110 mm is set, the quantity of the surplus solution over the exposure surface is preferably 40 μl to 160 μl.

In the above embodiments, the exposure opening 20a is a rectangle, but it may be a square. Also, the film unit is ejected in the direction of the long side of the exposure opening 20a, and the ejected film unit is spread by the spreading roller along the direction of the long side. In addition to this, the film unit may have a system, in which the film unit is ejected and spread along the short side of the exposure opening 20a.

Furthermore, the above embodiments give a description of the monosheet type film unit. In addition to this, the present invention may be adapted to the film unit of peel-apart type. This type of the film unit comprises a photosensitive sheet, where a pulling sheet with a tab is attached to the front end and a skirt is attached on the rear end, and an image receiving sheet held by a mask sheet on which an opening is formed to correspond to a screen. In this case, mask portions may be disposed on the four corners of the opening formed on the image receiving sheet, for defining the size of the screen.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An instant film unit comprising:
    a mask sheet, having an exposure opening of rectangle shape which is constituted by a first side and a second side extending in a conveying direction and a third side and a forth side extending in a widthwise direction perpendicular to said conveying direction, said mask sheet including a first folded end portion and a second folded end portion disposed on both ends of said exposure opening in said conveying direction;
    a first sheet overlaid on said mask sheet to close said exposure opening;
    a second sheet, being transparent, having a predetermined space to said first sheet, and attached to said first folded end portion and said second folded end portion of said mask sheet;
    a developing solution pod, enclosed in said first folded end portion and extending in said widthwise direction, said developing solution pod for being torn open while passing through a spreading roller so that developing solution is pushed out of said developing solution pod to spread between said first sheet and said second sheet;
    a trapping member, enclosed in said second folded end portion, said trapping member for catching a surplus of said developing solution passing through the area on which said exposure opening is disposed; and
    corner mask portions, disposed on four corners of said exposure opening, wherein:

said corner mask portions are formed by curving each corner of said exposure opening; and said curve has a radius of 1 to 4 mm.

2. An instant film unit as defined in claim 1 wherein said first sheet is a photographic sheet, in which an inner face is a photosensitive surface and an outer face is a positive image surface, said second sheet is a transparent cover sheet.

3. An instant film unit as defined in claim 1, wherein the linear length of said first and second sides is shorter than the length of a centerline of said exposure opening in said conveying direction.

4. An instant film unit comprising:

a mask sheet, having an exposure opening of rectangle shape which is constituted by a first side and a second side extending in a conveying direction and a third side and a forth side extending in a widthwise direction perpendicular to said conveying direction, said mask sheet including a first folded end portion and a second folded end portion disposed on both ends of said exposure opening in said conveying direction;

a first sheet overlaid on said mask sheet to close said exposure opening;

a second sheet, being transparent, having a predetermined space to said first sheet, and attached to said first folded end portion and said second folded end portion of said mask sheet;

a developing solution pod, enclosed in said first folded end portion and extending in said widthwise direction, said developing solution pod for being torn open while passing through a spreading roller so that developing solution is pushed out of said developing solution pod to spread between said first sheet and said second sheet;

a trapping member, enclosed in said second folded end portion, said trapping member for catching a surplus of said developing solution passing through the area on which said exposure opening is disposed; and corner mask portions, disposed on four corners of said exposure opening, wherein:

said corner mask portions are formed by curving each corner of said exposure opening; and the radius r(mm) of said curve satisfies the condition: r>0.4×(Q2−Q1), where:

$Q1(\mu l)$ is the quantity of developing solution, necessary to spread on the whole area of said exposure opening with four right angle corners when said developing solution being pushed out of said developing solution pod spreads toward said trapping member; and $Q2(\mu l)$ is the quantity of developing solution, necessary to spread on the whole area of said exposure opening with four curved corners when said developing solution being pushed out of said developing solution pod spreads toward said trapping material.

5. An instant film unit comprising:

a mask sheet, having an exposure opening of rectangle shape which is constituted by a first side and a second side extending in a conveying direction and a third side and a forth side extending in a widthwise direction perpendicular to said conveying direction, said mask sheet including a first folded end portion and a second folded end portion disposed on both ends of said exposure opening in said conveying direction;

a first sheet overlaid on said mask sheet to close said exposure opening;

a second sheet, being transparent, having a predetermined space to said first sheet, and attached to said first folded end portion and said second folded end portion of said mask sheet;

a developing solution pod, enclosed in said first folded end portion and extending in said widthwise direction, said developing solution pod for being torn open while passing through a spreading roller so that developing solution is pushed out of said developing solution pod to spread between said first sheet and said second sheet;

a trapping member, enclosed in said second folded end portion, said trapping member for catching a surplus of said developing solution passing through the area on which said exposure opening is disposed; and corner mask portions, disposed on four corners of said exposure opening, wherein:

said corner mask portions are formed by curving each corner of said exposure opening; and the conditions $Q2-Q1=(2L-a)bt$ and $(-a/b)x^1+a<r+(2rx_1-x_1^2)^{1/2}$ are satisfied, where:

$Q1(\mu l)$ is the quantity of developing solution, necessary to spread on the whole area of said exposure opening with four right angle corners when said developing solution being pushed out of said developing solution pod spreads toward said trapping member;

$Q2(\mu l)$ is the quantity of developing solution, necessary to spread on the whole area of said exposure opening with four curved corners when said developing solution being pushed out of said developing solution pod spreads toward said trapping material;

r(mm) is a radius of said curve;

a(mm) is a length in said conveying direction of a solution-deficient area where the developing solution is not spread, said solution-deficient area being formed on each corner of said exposure opening with four right angle corners;

b(mm) is a length of said solution-deficient area in said widthwise direction;

L(mm) is a width of said exposure opening;

t(mm) is a thickness of said developing solution on said exposure opening area; and $x_1$(mm) is an arbitrary length, satisfying $0<x_1<b$.

6. An instant film unit as defined in claim 4, wherein said first sheet is a photographic sheet, in which an inner face is a photosensitive surface and an outer face is a positive image surface, said second sheet is a transparent cover sheet.

7. An instant film unit as defined in claim 4, wherein the linear length of said first and second sides is shorter than the length of a centerline of said exposure opening in said conveying direction.

8. An instant film unit as defined in claim 5, wherein said first sheet is a photographic sheet, in which an inner face is a photosensitive surface and an outer face is a positive image surface, said second sheet is a transparent cover sheet.

9. An instant film unit as defined in claim 5, wherein the linear length of said first and second sides is shorter than the length of a centerline of said exposure opening in said conveying direction.

* * * * *